United States Patent [19]

Goodstine et al.

[11] 4,301,127

[45] Nov. 17, 1981

[54] FLUE GAS SCRUBBING SYSTEM

[75] Inventors: Stephen L. Goodstine, Windsor; Philip C. Rader, Windsor Locks, both of Conn.

[73] Assignee: Combustion Engineering, Inc., Windsor, Conn.

[21] Appl. No.: 60,553

[22] Filed: Jul. 25, 1979

[51] Int. Cl.³ ............................................. C01B 17/00
[52] U.S. Cl. ..................................... 423/242; 423/166
[58] Field of Search .......... 423/242 A, 242 R, 244 A, 423/244 R, 166, 512 A, 512 R

[56] References Cited

U.S. PATENT DOCUMENTS

| | | | |
|---|---|---|---|
| 2,080,779 | 5/1937 | Lessing | 423/242 |
| 2,113,198 | 4/1938 | Ronhebel et al. | 423/242 |
| 3,995,006 | 11/1976 | Downs et al. | 423/242 |
| 4,002,724 | 1/1977 | McKie | 423/242 |
| 4,024,220 | 5/1977 | Ostroff et al. | 423/242 |

OTHER PUBLICATIONS

Gagunini et al.; "Sulfur Oxides Removal by Wet Scrubbing –Application to Utility Boilers" Oct. 1975.

*Primary Examiner*—O. R. Vertiz
*Assistant Examiner*—Gregory A. Heller
*Attorney, Agent, or Firm*—Edward L. Kochey, Jr.

[57] ABSTRACT

An $SO_2$ flue gas scrubbing system wherein a calcium compound is dissolved in water and recirculated in contact with the flue gases. Calcium sulfite and sulfate formed in this process are also recirculated. A stream of the slurry passing to waste is separated based on the rate of settling of the constituents so that calcium sulfate and undissolved calcium compound is returned to the recirculating system with the calcium sulfite being sent to waste.

1 Claim, 1 Drawing Figure

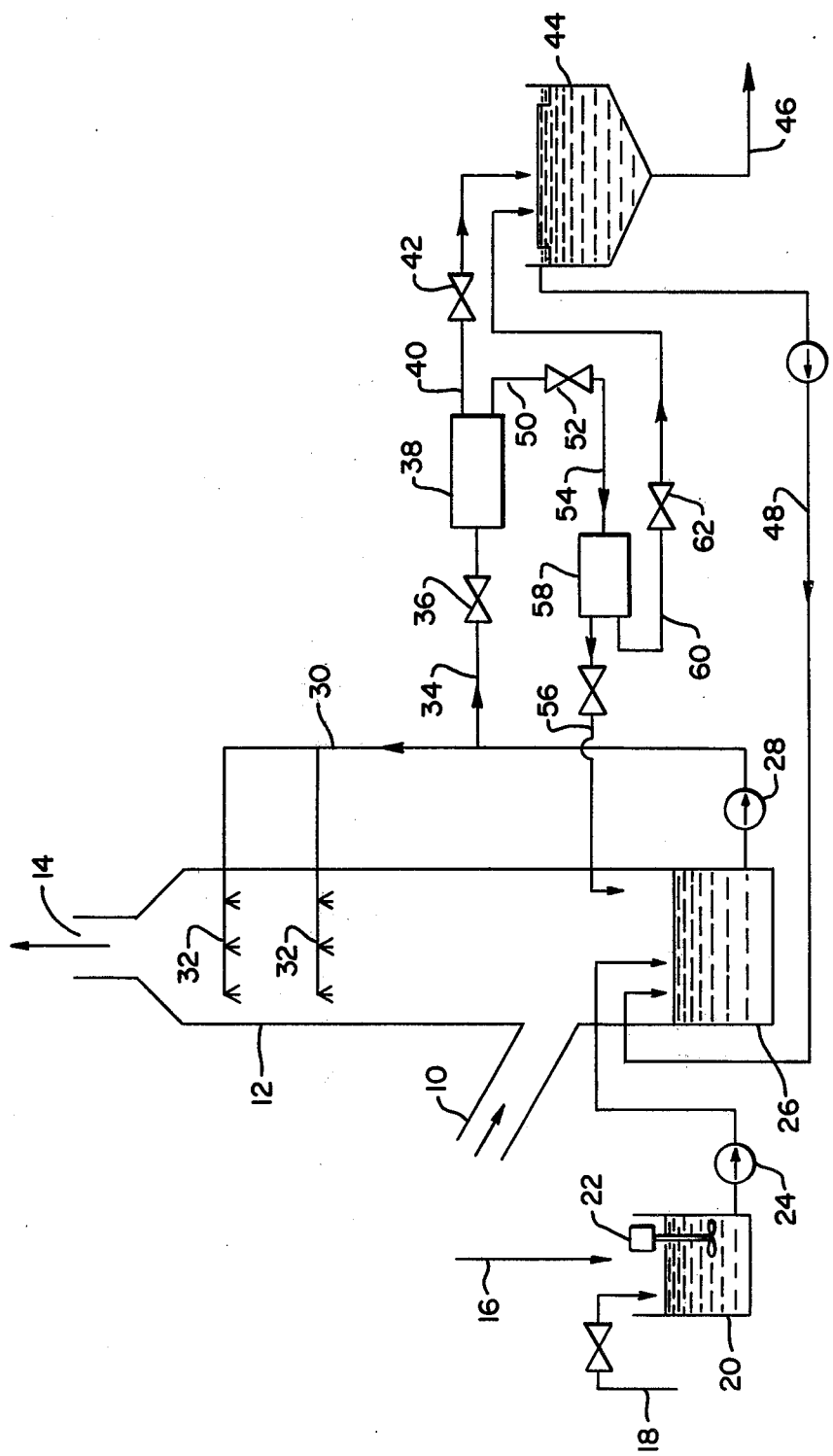

FLUE GAS SCRUBBING SYSTEM

BACKGROUND OF THE INVENTION

This invention relates to $SO_2$ flue gas scrubbing systems using calcium compounds as an additive and in particular to a method of improving additive utilization and reducing the required solid content of the circulating slurry.

Calcium compounds such as calcium carbonate and calcium hydroxide are frequently used in $SO_2$ flue gas scrubbing systems. In such systems, the calcium compound is dissolved in water and recirculated in contact with the flue gas. The $SO_2$ combines with the calcium compound to form calcium sulfite, and a portion of this is oxidized to calcium sulfate. While the calcium compound is preferably completely dissolved in the water prior to adding the solution to the recirculating scrubber system, this is not practically possible since the calcium compounds are difficult to dissolve. Accordingly, some undissolved compound remains in the slurry, and it will dissolve in time if it is left in the system. Only after it is dissolved is it effective in performing the scrubbing operation. Any of the calcium compound which is sent to waste before dissolving is wasted.

Calcium sulfate forming in the system has a tendency to deposit and build up on the internal scrubber surfaces. It has been found that this incrustation can be avoided by maintaining sufficient calcium sulfate crystals in the slurry as a seed. The additional calcium sulfate forming will preferentially deposit on the circulating crystals rather than on the scrubber surfaces.

In order to remove the sulfur compounds from the system, minimize wear on the components, and maintain the slurry in a reasonably fluid condition, a slip stream of the recirculated slurry is withdrawn and passed to waste. The liquid portion is normally returned to the slurry system.

Normal operation of the system requires the circulation of high total solids concentrations in order to provide ample calcium sulfate seed crystals to prevent scaling. One method used to minimize the total solids concentrations is forced oxidation where air is pumped through the slurry mixture. This oxidizes a portion of the sulfite crystals to sulfate, thereby providing a sufficient amount of seed crystals. Such operation, however, is expensive since it requires additional investment and operating power to pump air through the system.

SUMMARY OF THE INVENTION

A large portion of the naturally-formed sulfate is retained in the recirculating system as well as a portion of the undissolved calcium compound. The slip stream passing to waste is separated based on the rate of settling of the constituents into a stream which is rich in the calcium sulfite and a stream which is rich in calcium sulfate and undissolved additives.

The stream containing primarily calcium sulfite is sent through a thickener to waste in the normal manner. The stream which is rich in the calcium sulfate and undissolved calcium compound is recycled to the scrubber slurry system as required to maintain the desired concentration of calcium sulfate crystals in the recirculating slurry system.

Since the retention of the calcium sulfate crystals in the system may lead to substantial growth in crystal size, the stream being returned to the slurry may also be separated to remove the larger crystals so that these crystals may also be rejected to waste.

A desired concentration of the calcium sulfate crystals may be retained in the circulating slurry loop without resort to forced oxidation of the slurry. Also, portions of the undissolved additive which normally would be sent to waste are conveniently recycled to the slurry system where they may ultimately dissolve to increase the additive utilization of the system.

The calcium sulfite crystals are flake-like in form and are known to be very slow to settle in a slurry. The calcium sulfate crystals, on the other hand, as well as the calcium compounds which are normally added to such systems settle relatively rapidly. This difference in settling rate is the characteristic used to obtain the desired separation of the stream into the calcium sulfite rich stream and the other stream.

BRIEF DESCRIPTION OF THE DRAWING

The drawing is a schematic illustration of the scrubber system.

DESCRIPTION OF THE PREFERRED EMBODIMENT

Flue gas containing $SO_2$ passes through duct 10 into scrubber 12. The gas passes upwardly therethru contacting a slurry and exits through duct 14 passing then through a stack not shown.

A calcium compound additive such as lime or limestone 16 is mixed with water passing through line 18 in the additive slurry tank 20. The slurry is stirred by mixer 22 to dissolve as much as possible before it is pumped as required by pump 24 into a reaction tank 26 located immediately below the scrubber. The slurry from the reaction tank is pumped by pump 28 through recirculating line 30 through spray nozzles 32. It is sprayed downwardly into the upwardly moving flue gas effecting contact between the slurry and the flue gas, resulting in the formation of calcium sulfite as the $SO_2$ is removed from the flue gas. Oxygen in the flue gas causes a portion of the sodium sulfite to be converted to sodium sulfate. Gas-liquid contactors of types other than the illustrated spray tower could be used as an alternative.

As this slurry returns to the reaction tank 26, it includes calcium sulfite, calcium sulfate, and some undissolved calcium compound.

Where the additive is calcium hydroxide, the control of the supply of additive to the reaction tank 26 is regulated to maintain the pH of the slurry in the tank between 6.0 and 10.0, preferably 8.0 to 9.5. Where the additive is calcium carbonate, the additive feed rate is controlled by the sulfur dioxide concentration entering the absorber and the flue gas flow rate. The solids in the recirculating loop will build up as calcium sulfite and calcium sulfate crystals. It is desirable to maintain the level of calcium sulfate crystals in the slurry at 1–5 percent. The calcium sulfite crystals achieve no useful purpose and are recirculated with the slurry because a once-thru system would waste inordinate amounts of the calcium compound. In order to control the solids level in the recirculating slurry loop to an acceptable level such as 5–15 percent, a slip stream of the recirculated slurry is withdrawn through line 34 controlled by valve 36. It passes into a settling separator 38 which may be a tank with alow velocity horizontal flow wherein the relatively rapid settling calcium sulfate crystals and calcium compound will tend to pass toward the bottom of the tank while the slow-settling calcium sulfite crystals will remain near the top of the tank. Discharge line 40 controlled by valve 42 is located near the upper portion of the tank so that a first portion of flow from the tank is withdrawn which is rich in the calcium sulfite crystals. This waste stream is passed to thickener 44 with the sludge being passed to waste through line 46. The liquid portion of the slurry passes through the overflow of the thickener through line 48 from which it is recirculated to the reaction tank 26.

A second portion of flow from separator 38 passes through line 50 controlled by valve 52 which is located in the lower portion of the separator 38. This second portion is rich in the rapidly settling calcium sulfate crystals and undissolved calcium compound. This portion of flow may be passed through lines 54 and 56 back to the reaction tank 26. This withdrawal system is controlled to maintain the total solids concentration in the recirculating slurry system typically to a desirable level such as 5-15 percent. The amount of calcium sulfate returned is controlled to maintain the calcium sulfate crystal concentration in the recirculating slurry loop typically at 1-5 percent. Undissolved calcium compounds are returned along with the returned calcium sulfate.

It is known that sludge disposal from a scrubbing system is more difficult where sulfite is being rejected than where sulfate is being rejected. Despite the recycling of sulfate, the current system actually disposes of the same ratio of sulfate and sulfite with the recycle as it would without the recycle during steadystate operation. The total sulfate formed depends on the natural oxidation in the scrubber which does not change with this new system. During initial start-up, less sulfate is discharged than is formed until the concentration in the recirculating system builds up to the desirable level. Thereafter, the recycle of sulfate is controlled to maintain this desired level, and the sulfate actually being formed passes to disposal.

The separation of the sulfate crystals and their continued recycle through the slurry recirculating system can lead to inordinately large sulfate crystals being formed. In order to eliminate this problem, an additional separator 58 is supplied which will separate the slurry based on the size of particles contained. This may also be a gravity separation system if desired or a filter system. The large crystals are removed through line 60 controlled by valve 62 and passed to the thickener 44. An alternate method would be to employ a grinder to reduce the size of the calcium sulfate and undissolved calcium particles retained in the system.

It can be seen that this system is capable of retaining any desired level of calcium sulfate crystals for seed purposes to avoid sulfate scaling of the surfaces. This is accomplished without the requirement for forced oxidation of the system. At the same time the system increases the utilization of the additive by recycling the undissolved additive passing through extraction line 34 and which would normally be sent to waste.

What is claimed is:

1. A method of operating a scrubbing system using a dissolved calcium compound for the removal of $SO_2$ from flue gas comprising: mixing a calcium compound with water; contacting the $SO_2$ containing flue gas and the calcium compound mixture, thereby obtaining a slurry containing calcium sulfite and calcium sulfate and undissolved calcium compound; collecting the slurry; returning the collected slurry for repeated contact with the gas; adding additional calcium compounds to the slurry; extracting a portion of the collected slurry; partially separating the extracted portion of the collected slurry into a first stream rich in calcium sulfite and a second stream rich in calcium sulfate and undissolved calcium compound, based on the rate of settling of each of the constituents; passing the calcium sulfite of said first stream to waste; separating the largest crystals of calcium sulfate which enter said second stream from said second stream; passing these large crystals to waste; and returning the calcium sulfate and undissolved calcium compound remaining in said second stream to said collected slurry in an amount to maintain the desired sulfate concentration in the slurry.

* * * * *